(12) United States Patent
Gielda et al.

(10) Patent No.: US 8,505,322 B2
(45) Date of Patent: *Aug. 13, 2013

(54) BATTERY COOLING

(75) Inventors: Thomas Gielda, Saint Joseph, MI (US);
Kristian Debus, Petaluma, CA (US);
Jay Harman, San Rafael, CA (US); Don Tomasi, Stevensville, MI (US)

(73) Assignee: Pax Scientific, Inc., San Rafael, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 12/902,056

(22) Filed: Oct. 11, 2010

(65) Prior Publication Data
US 2011/0048066 A1    Mar. 3, 2011

Related U.S. Application Data

(63) Continuation-in-part of application No. 12/732,171, filed on Mar. 25, 2010, now Pat. No. 8,333,080.

(60) Provisional application No. 61/384,653, filed on Sep. 20, 2010, provisional application No. 61/163,438, filed on Mar. 25, 2009, provisional application No. 61/228,557, filed on Jul. 25, 2009.

(51) Int. Cl.
*F25D 23/12*    (2006.01)
*F25B 1/00*     (2006.01)
*H01M 10/50*    (2006.01)

(52) U.S. Cl.
USPC ............... 62/259.2; 62/116; 62/500; 429/120

(58) Field of Classification Search
USPC ............... 62/5, 61, 116, 259.2, 500; 429/120
See application file for complete search history.

(56) References Cited

U.S. PATENT DOCUMENTS

| 1,860,447 A | 5/1932 | Bergdoll |
| 2,116,480 A | 5/1938 | Russell |
| 2,928,779 A | 3/1960 | Weills et al. |
| 3,228,848 A | 1/1966 | Fellows |
| 3,425,486 A | 2/1969 | Burton et al. |
| 3,510,266 A | 5/1970 | Midler, Jr. |

(Continued)

FOREIGN PATENT DOCUMENTS

| EP | 1 080 648 A2 | 7/2001 |
| JP | 60-175980 | 9/1985 |

(Continued)

OTHER PUBLICATIONS

PCT Application No. PCT/US2010/28761, International Search Report and Written Opinion mailed Jun. 16, 2010, 6pgs.

(Continued)

*Primary Examiner* — Frantz Jules
*Assistant Examiner* — Daniel C Comings
(74) *Attorney, Agent, or Firm* — Lewis and Roca LLP

(57) ABSTRACT

A battery cooling system operates by pumping liquid through a cooling fluid circulation path. Because the battery cooling system pumps liquid, the compression system that generates the cooling power does not require the use of a condenser. The compression system utilizes a compression wave. An evaporator of the cooling system operates in the critical flow regime in which the pressure in an evaporator tube will remain almost constant and then 'jump' or 'shock up' to an increased pressure.

20 Claims, 8 Drawing Sheets

(56) References Cited

U.S. PATENT DOCUMENTS

| | | | |
|---|---|---|---|
| 3,548,589 | A | 12/1970 | Cooke-Yarborough |
| 3,552,120 | A | 1/1971 | Beale |
| 3,621,667 | A * | 11/1971 | Mokadam ............... 62/116 |
| 3,866,433 | A | 2/1975 | Krug |
| 4,031,712 | A | 6/1977 | Costello |
| 4,044,558 | A | 8/1977 | Benson |
| 4,057,962 | A | 11/1977 | Belaire |
| 4,089,187 | A | 5/1978 | Schumacher et al. |
| 4,201,263 | A | 5/1980 | Anderson |
| 4,333,796 | A | 6/1982 | Flynn |
| 4,442,675 | A | 4/1984 | Wilensky |
| 4,858,155 | A | 8/1989 | Okawa et al. |
| 4,998,415 | A | 3/1991 | Larsen |
| 5,074,759 | A | 12/1991 | Cossairt |
| 5,083,429 | A | 1/1992 | Veres et al. |
| 5,205,648 | A | 4/1993 | Fissenko |
| 5,275,486 | A | 1/1994 | Fissenko |
| 5,317,905 | A | 6/1994 | Johnson |
| 5,338,113 | A | 8/1994 | Fissenko |
| 5,353,602 | A | 10/1994 | Pincus |
| 5,544,961 | A | 8/1996 | Fuks et al. |
| 5,659,173 | A | 8/1997 | Putterman et al. |
| 5,810,037 | A | 9/1998 | Sasaki et al. |
| 5,980,698 | A | 11/1999 | Abrosimov |
| 6,105,382 | A | 8/2000 | Reason |
| 6,170,289 | B1 | 1/2001 | Brown |
| 6,190,498 | B1 | 2/2001 | Blagborne |
| 6,280,578 | B1 | 8/2001 | Popov |
| 6,398,918 | B1 | 6/2002 | Popov |
| 6,604,376 | B1 | 8/2003 | Demarco et al. |
| 6,655,165 | B1 | 12/2003 | Eisenhour |
| 6,719,817 | B1 | 4/2004 | Marin |
| 6,739,141 | B1 | 5/2004 | Sienel et al. |
| 6,835,484 | B2 | 12/2004 | Fly |
| 6,889,754 | B2 | 5/2005 | Kroliczek et al. |
| 7,004,240 | B1 | 2/2006 | Kroliczek et al. |
| 7,131,294 | B2 | 11/2006 | Manole |
| 7,178,353 | B2 | 2/2007 | Cowans et al. |
| 7,251,889 | B2 | 8/2007 | Kroliczek et al. |
| 7,381,241 | B2 | 6/2008 | Tessien et al. |
| 7,387,093 | B2 | 6/2008 | Hacsi |
| 7,387,660 | B2 | 6/2008 | Tessien et al. |
| 7,399,545 | B2 | 7/2008 | Fly |
| 7,415,835 | B2 | 8/2008 | Cowans et al. |
| 7,448,790 | B2 | 11/2008 | Tessien et al. |
| 7,549,461 | B2 | 6/2009 | Kroliczek et al. |
| 7,654,095 | B2 | 2/2010 | Sullivan |
| 7,656,808 | B2 | 2/2010 | Manthoulis et al. |
| 7,708,053 | B2 | 5/2010 | Kroliczek et al. |
| 7,721,569 | B2 | 5/2010 | Manole |
| 7,726,135 | B2 | 6/2010 | Sullivan |
| 7,765,820 | B2 | 8/2010 | Cowans et al. |
| 7,796,389 | B2 | 9/2010 | Edmunds et al. |
| 2002/0090047 | A1 | 7/2002 | Stringham |
| 2002/0177035 | A1* | 11/2002 | Oweis et al. ............... 429/120 |
| 2004/0172966 | A1 | 9/2004 | Ozaki et al. |
| 2005/0048339 | A1 | 3/2005 | Fly |
| 2006/0018419 | A1 | 1/2006 | Tessien |
| 2006/0018420 | A1 | 1/2006 | Tessien |
| 2006/0032625 | A1 | 2/2006 | Angelis et al. |
| 2006/0191049 | A1 | 8/2006 | Elkins et al. |
| 2007/0028646 | A1 | 2/2007 | Oshitani et al. |
| 2007/0199333 | A1 | 8/2007 | Windisch |
| 2007/0271939 | A1 | 11/2007 | Ichigaya |
| 2008/0006051 | A1 | 1/2008 | Johnson |
| 2008/0057382 | A1* | 3/2008 | Kimura ............... 429/120 |
| 2008/0105315 | A1 | 5/2008 | Botros et al. |
| 2008/0277098 | A1 | 11/2008 | Fly |
| 2008/0292948 | A1* | 11/2008 | Kumar et al. ............... 429/120 |
| 2009/0272128 | A1 | 11/2009 | Ali |
| 2009/0293513 | A1 | 12/2009 | Sullivan |
| 2010/0043633 | A1 | 2/2010 | Galbraith |
| 2010/0090469 | A1 | 4/2010 | Sullivan |
| 2010/0126212 | A1 | 5/2010 | May |
| 2010/0154445 | A1 | 6/2010 | Sullivan |
| 2010/0287954 | A1 | 11/2010 | Harman et al. |
| 2011/0030390 | A1 | 2/2011 | Charamko et al. |
| 2011/0048048 | A1 | 3/2011 | Gielda et al. |
| 2011/0048062 | A1 | 3/2011 | Gielda et al. |
| 2011/0051549 | A1 | 3/2011 | Debus et al. |
| 2011/0088419 | A1 | 4/2011 | Harman et al. |
| 2011/0088878 | A1 | 4/2011 | Harman et al. |
| 2011/0094249 | A1 | 4/2011 | Harman et al. |
| 2011/0113792 | A1 | 5/2011 | Harman et al. |
| 2011/0117511 | A1 | 5/2011 | Harman et al. |
| 2011/0139405 | A1 | 6/2011 | Harman et al. |
| 2012/0000631 | A1 | 1/2012 | Charamko et al. |
| 2012/0118538 | A1 | 5/2012 | Gielda et al. |
| 2012/0205080 | A1 | 8/2012 | Debus et al. |
| 2012/0260673 | A1 | 10/2012 | Charamko et al. |
| 2012/0260676 | A1 | 10/2012 | Charamko et al. |

FOREIGN PATENT DOCUMENTS

| | | |
|---|---|---|
| JP | 2002130770 | 5/2002 |
| JP | 2003021410 | 1/2003 |
| JP | 2003034135 | 2/2003 |
| JP | 2005-240689 | 9/2005 |
| JP | 2009-221883 | 10/2009 |
| WO | 2004072567 A2 | 8/2004 |
| WO | WO 2006/054408 | 5/2006 |
| WO | 2006137850 A2 | 12/2006 |
| WO | 2009070728 A1 | 6/2009 |
| WO | 2009123674 A2 | 10/2009 |
| WO | 2010042467 A2 | 4/2010 |

OTHER PUBLICATIONS

U.S. Appl. No. 12/876,985, Jayden David Harman, System and Method for Heat Transfer, filed Sep. 7, 2010.

U.S. Appl. No. 12/945,799, Thomas Gielda, Pump-Less Cooling, filed Nov. 12, 2010.

U.S. Appl. No. 13/039,121, Thomas Gielda, Cooling of Heat Intensive Systems, filed Mar. 2, 2011.

U.S. Appl. No. 13/028,089, Kristian Debus, Pump-Less Cooling Using a Rotating Disk, filed Feb. 15, 2011.

U.S. Appl. No. 13/028,083, Thomas Gielda, Supersonic Cooling with a Pulsed Inlet, filed Feb. 15, 2011.

U.S. Appl. No. 12/960,979, Jayden David Harman, Thermodynamic Cycle for Cooling a Working Fluid, filed Dec. 6, 2010.

U.S. Appl. No. 12/961,015, Jayden David Harman, Pressure Shock-Induced Cooling Cycle, filed Dec. 6, 2010.

U.S. Appl. No. 12/961,342, Jayden David Harman, Supersonic Cooling System, filed Dec. 6, 2010.

U.S. Appl. No. 12/961,366, Jayden David Harman, Heat Exchange and Cooling Systems, filed Dec. 6, 2010.

U.S. Appl. No. 12/961,386, Jayden David Harman, Heating and Cooling of Working Fluids, filed Dec. 6, 2010.

International Preliminary Report on Patentability mailed on Aug. 19, 2011 in Patent Cooperation Treaty application No. PCT/US2010/028761 filed Mar. 25, 2010.

International Search Report mailed Jul. 25, 2011 in Patent Cooperation Treaty application No. PCT/US2011/027845 filed Mar. 10, 2011.

"Nozzle Applet" Published by Virginia Polytechnic Institute and State University (Virginia Tech) and retrieved on May 10, 2011 at http://www.engapplets.vt.edu/fluids/CDnozzle/cdinfo.html.

Interview Summary mailed Mar. 16, 2011 in U.S. Appl. No. 12/960,979, filed Dec. 6, 2010.

Final Office Action mailed May 19, 2011 in U.S. Appl. No. 12/960,979, filed Dec. 6, 2010.

Interview Summary mailed Mar. 10, 2011 in U.S. Appl. No. 12/961,015, filed Dec. 6, 2010.

Interview Summary mailed Mar. 18, 2011 in U.S. Appl. No. 12/961,342, filed Dec. 6, 2010.

Final Office Action mailed May 17, 2011 in U.S. Appl. No. 12/961,342, filed Dec. 6, 2010.

Interview Summary mailed Jul. 13, 2011 in U.S. Appl. No. 12/961,342, filed Dec. 6, 2010.

Office Action mailed Mar. 18, 2011 in U.S. Appl. No. 12/961,386, filed Dec. 6, 2010.

U.S. Appl. No. 13/048,633, David Halt, Supersonic Cooling Nozzle With Airfoils, filed Mar. 15, 2011.
U.S. Appl. No. 13/087,062, Serguei Charamko, Cooling System Utilizing a Reciprocating Piston, filed Apr. 14, 2011.
U.S. Appl. No. 13/088,593, Serguei Charamko, Cooling System Utilizing a Conical Body, filed Apr. 18, 2011.
U.S. Appl. No. 13/113,626, Kristian Debus et al., Supersonic Cooling Nozzle Inlet, filed May 23, 2011.
U.S. Appl. No. 13/115,930, Tom Gielda, Supersonic Cooling with Pulsed Inlet and Bypass Loop, filed May 25, 2011.
U.S. Appl. No. 12/753,824, Serguei Charamko, Vortex Tube, filed Apr. 2, 2010.
U.S. Appl. No. 12/843,834, Kristian Debus, Nucleation Ring for a Central Insert, filed Jul. 26, 2010.
U.S. Appl. No. 12/880,940, Thomas Gielda, Portable Cooling Unit, filed Sep. 13, 2010.
U.S. Appl. No. 12/902,060, Thomas Gielda, Personal Cooling System, filed Oct. 11, 2010.
Energy Efficiency Manual, "Compression Cooling," D.R. Wulfinghoff, 1999, pp. 1299-1321.
M. Guglielmone et al., Heat Recovery from Vapor Compression Air Conditioning: A Brief Introduction, Turbotec Products, Inc., May 14, 2008.
Robert H. Turner, "Water Consumption of Evaporative Cooling Systems," 21st Intersociety Energy Conversation Engineering Conference, San Diego, California, Aug. 25-29, 1986.
S. Klein et al., "Solar Refrigeration," American Society of Heating, Refrigerating and Conditioning Engineers, Inc., ASHRAE Journal, vol. 47, No. 9, Sep. 2005.
NASA Tech Briefs, "Vapor-Compression Solar Refrigerator Without Batteries," Sep. 2001, http://www.techbriefs.com/component/content/article/7426.
Wikipedia, "Stirling engine," http://en.wikipedia.org/wiki/Stirling_engine, visited May 3, 2010.
Fox, et al., "Supersonic Cooling by Shock-Vortex Interaction," J. Fluid Mech. 1996, vol. 308, pp. 363-379.
Hu, et al., "Numerical and Experimental Study of a Hydrodynamic Cavitation Tube," Metallurgical and Materials Transactions B, vol. 29B, Aug. 1998.
Mishra, et al., "Development of Cavitation in Refrigerant (R-123) Flow Inside Rudimentary Microfluidic Systems," Journal of Microelectromechanical Systems, vol. 15, No. 5, Oct. 2006.
Non-final office action mailed Feb. 4, 2011 in U.S. Appl. No. 12/960,979.
Non-final office action mailed Feb. 16, 2011 in U.S. Appl. No. 12/961,015.
Non-final office action mailed Feb. 1, 2011 in U.S. Appl. No. 12/961,342.
Combined search and examination report mailed Jan. 21, 2011 in U.K. patent application No. GB1021925.1.
PCT Application No. PCT/US2012/021140, International Search Report mailed Jun. 12, 2012, 3pgs.
PCT Application No. PCT/US2012/021139, International Search Report mailed Aug. 14, 2012, 3pgs.
U.S. Appl. No. 12/732,171, Office Action mailed Jan. 23, 2012.
U.S. Appl. No. 12/876,985, Office Action mailed Feb. 29, 2012.
U.S. Appl. No. 12/880,940, Office Action mailed Sep. 19, 2012.
U.S. Appl. No. 12/902,060, Office Action mailed Sep. 26, 2012.
U.S. Appl. No. 12/960,979, Office Action mailed Mar. 9, 2012.
U.S. Appl. No. 12/961,015, Office Action mailed Jul. 3, 2012.
U.S. Appl. No. 12/961,015, Final Office Action mailed Dec. 9, 2011.
U.S. Appl. No. 12/961,342, Office Action mailed Dec. 13, 2011.
U.S. Appl. No. 12/961,366, Final Office Action mailed Aug. 31, 2012.
U.S. Appl. No. 12/961,366, Office Action mailed Feb. 24, 2012.
U.S. Appl. No. 12/961,386, Final Office Action mailed Dec. 13, 2011.

* cited by examiner

BATTERY COOLING

CROSS-REFERENCE TO RELATED APPLICATIONS

The present application is a continuation-in-part and claims the priority benefit of U.S. patent application Ser. No. 12/732,171, filed Mar. 25, 2010 now U.S. Pat. No. 8,333,080, and U.S. provisional application No. 61/384,653, filed Sep. 20, 2010. U.S. patent application Ser. No. 12/732,171 claims the priority benefit of U.S. provisional application No. 61/163,438, filed Mar. 25, 2009, and U.S. provisional application No. 61/228,557, filed Jul. 25, 2009. The disclosure of each of the aforementioned applications is incorporated herein by reference.

BACKGROUND OF THE INVENTION

1. Field of the Invention

The present invention generally relates to cooling systems. The present invention more specifically relates to cooling systems for high power battery packs.

2. Description of the Related Art

A vapor compression system as known in the art generally includes a compressor, a condenser, and an evaporator. These systems also include an expansion device. The combined weight of these elements greatly reduces their effectiveness for cooling batteries, due to the portable nature of battery powered devices.

In a prior art vapor compression system, a gas is compressed whereby the temperature of that gas is increased beyond that of the ambient temperature. The compressed gas is then run through a condenser and turned into a liquid. The condensed and liquefied gas is then taken through an expansion device, which drops the pressure and the corresponding temperature. The resulting refrigerant is then boiled in an evaporator. This vapor compression cycle is generally known to those of skill in the art.

FIG. 1 illustrates a vapor compression system 100 as might be found in the prior art. In the prior art vapor compression system 100 of FIG. 1, compressor 110 compresses the gas to (approximately) 238 pounds per square inch (PSI) and a temperature of 190° F. Condenser 120 then liquefies the heated and compressed gas to (approximately) 220 PSI and 117° F. The gas that was liquefied by the condenser 120 is then passed through the expansion valve 130 of FIG. 1. By passing the liquefied gas through expansion valve 130, the pressure is dropped to (approximately) 20 PSI. A corresponding drop in temperature accompanies the drop in pressure, which is reflected as a temperature drop to (approximately) 34° F. in FIG. 1. The refrigerant that results from dropping the pressure and temperature at the expansion valve 130 is boiled at evaporator 140. Through boiling of the refrigerant by evaporator 140, a low temperature vapor results, which is illustrated in FIG. 1 as having (approximately) a temperature of 39° F. and a corresponding pressure of 20 PSI.

The cycle related to the system 100 of FIG. 1 is sometimes referred to as the vapor compression cycle. Such a cycle generally results in a coefficient of performance (COP) between 2.4 and 3.5. The coefficient of performance, as reflected in FIG. 1, is the evaporator cooling power or capacity divided by compressor power. It should be noted that the temperature and pressure references that are reflected in FIG. 1 are exemplary and illustrative.

FIG. 2 illustrates the performance of a vapor compression system like that illustrated in FIG. 1. The COP illustrated in FIG. 2 corresponds to a typical home or automotive vapor compression system—like that of FIG. 1—operating in an ambient temperature of (approximately) 90° F. The COP shown in FIG. 2 further corresponds to a vapor compression system utilizing a fixed orifice tube system.

Such a system 100, however, operates at an efficiency rate (i.e., COP) that is far below that of system potential. To compress gas in a conventional vapor compression system 100 like that illustrated in FIG. 1 typically takes 1.75-2.5 kilowatts for every 5 kilowatts of cooling power generated. This exchange rate is less than optimal and directly correlates to the rise in pressure times the volumetric flow rate. Degraded performance is similarly and ultimately related to performance (or lack thereof) by the compressor 110.

Haloalkane refrigerants such as tetrafluoroethane ($CH_2FCF_3$) are inert gases that are commonly used as high-temperature refrigerants in refrigerators and automobile air conditioners. Haloalkane refrigerants have also been used to cool over-clocked computers. These inert, refrigerant gases are more commonly referred to as R-134 gases. The volume of an R-134 gas can be 600-1000 times greater than the corresponding liquid.

In light of the theoretical efficiencies of systems using haloalkanes or other fluids, there is a need in the art for an improved cooling system that more fully recognizes system potential and overcomes technical barriers related to compressor performance. There is also a need for cooing systems with reduced weight.

SUMMARY OF THE CLAIMED INVENTION

The battery cooling system disclosed herein includes a cooling fluid circulation path in thermal contact with at least one battery cell in a battery pack. The cooling fluid circulation path may include a cooling jacket. The cooling jacket may be thermally coupled to at least a portion of the battery pack. The cooling jacket may include a plurality of receptacles, each receptacle receiving a cell of the battery pack, or the cooling jacket may surround an exterior of the battery pack. A housing of the cooling jacket may be rigid or flexible, depending on the parameters of a given application.

The system further includes a pump that maintains a circulatory fluid flow through the cooling fluid circulation path and a working fluid flow path. The system also includes an evaporator that operates in the critical flow regime of the circulatory working fluid. The evaporator generates a compression wave that shocks the maintained fluid flow, thereby changing the pressure of the maintained fluid flow and exchanging heat introduced into the circulatory fluid flow. The evaporator may use one or more tubes/nozzles.

Operating conditions within the unit may include the pump raising the pressure of the circulatory working fluid flow from approximately 20 PSI to approximately 100 PSI. In certain embodiments, the pressure may be raised to pressures in excess of 100 PSI, such as 300 or 500 PSI.

A battery cooling system according to the technology disclosed herein may include a cooling fluid circulation path in close proximity to at least one battery cell in a battery pack. The system may include a pump that maintains a fluid flow through a working fluid flow path, and at least one evaporator that operates in the critical flow regime of the working fluid and generates a compression wave that shocks the maintained fluid flow, thereby changing the pressure of the maintained fluid flow to cool the working fluid, the evaporator being in close proximity to the at least one battery cell so that heat is removed from the battery cell via conduction.

Another battery cooling system may include a series of single tube evaporators aligned in parallel, each tube being in close proximity to a battery cell. This allows the working fluid of the evaporators to remove heat from the battery cells via conduction.

DETAILED DESCRIPTION

Figure 3:
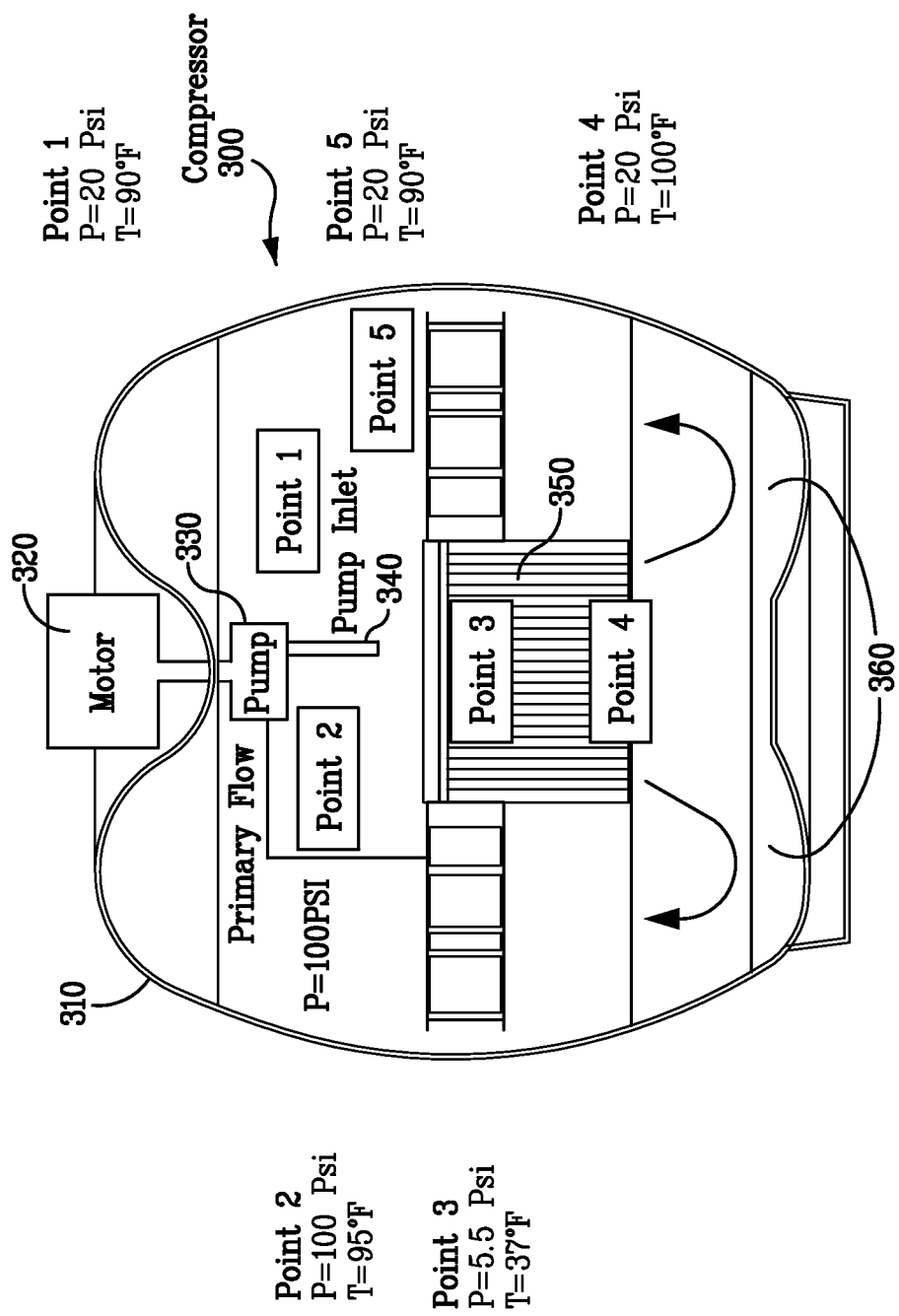
FIG. 3 illustrates an exemplary cooling system in accordance with an embodiment of the present invention.

FIG. 3 illustrates an exemplary cooling system 300 in accordance with an embodiment of the present invention. The cooling system 300 does not need to compress a gas as otherwise occurs at compressor 110 in a prior art vapor compression system 100 like that shown in FIG. 1. Cooling system 300 operates by pumping a working liquid. Because cooling system 300 pumps liquid, the compression cooling system 300 does not require the use of a condenser 120 as does the prior art compression system 100 of FIG. 1. Compression cooling system 300 instead utilizes a compression wave. The evaporator of cooling system 300 operates in the critical flow regime where the pressure in an evaporator tube will remain almost constant and then 'jump' or 'shock up' to the ambient pressure.

Figure 1:
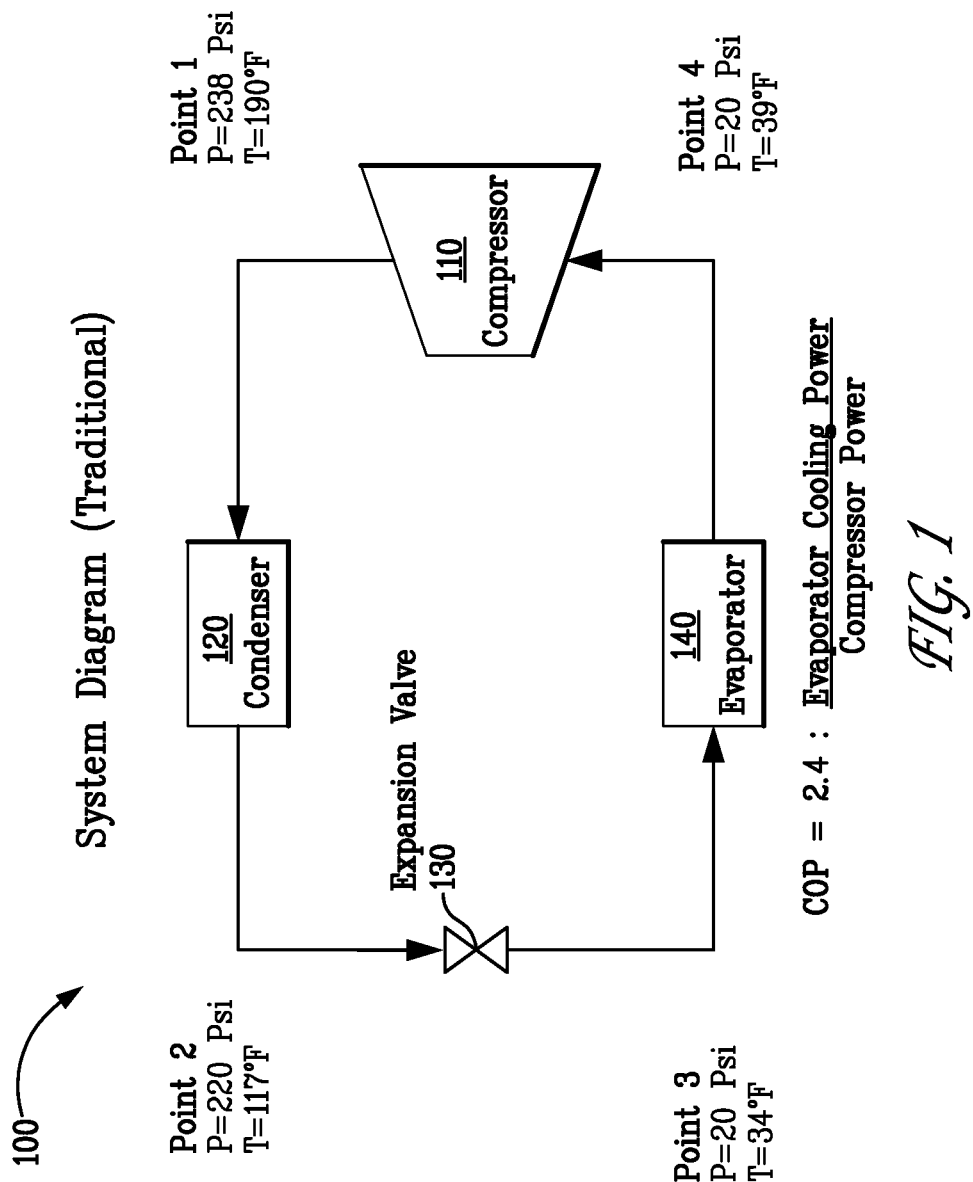
FIG. 1 illustrates a vapor compression system as might be found in the prior art.
Figure 2:
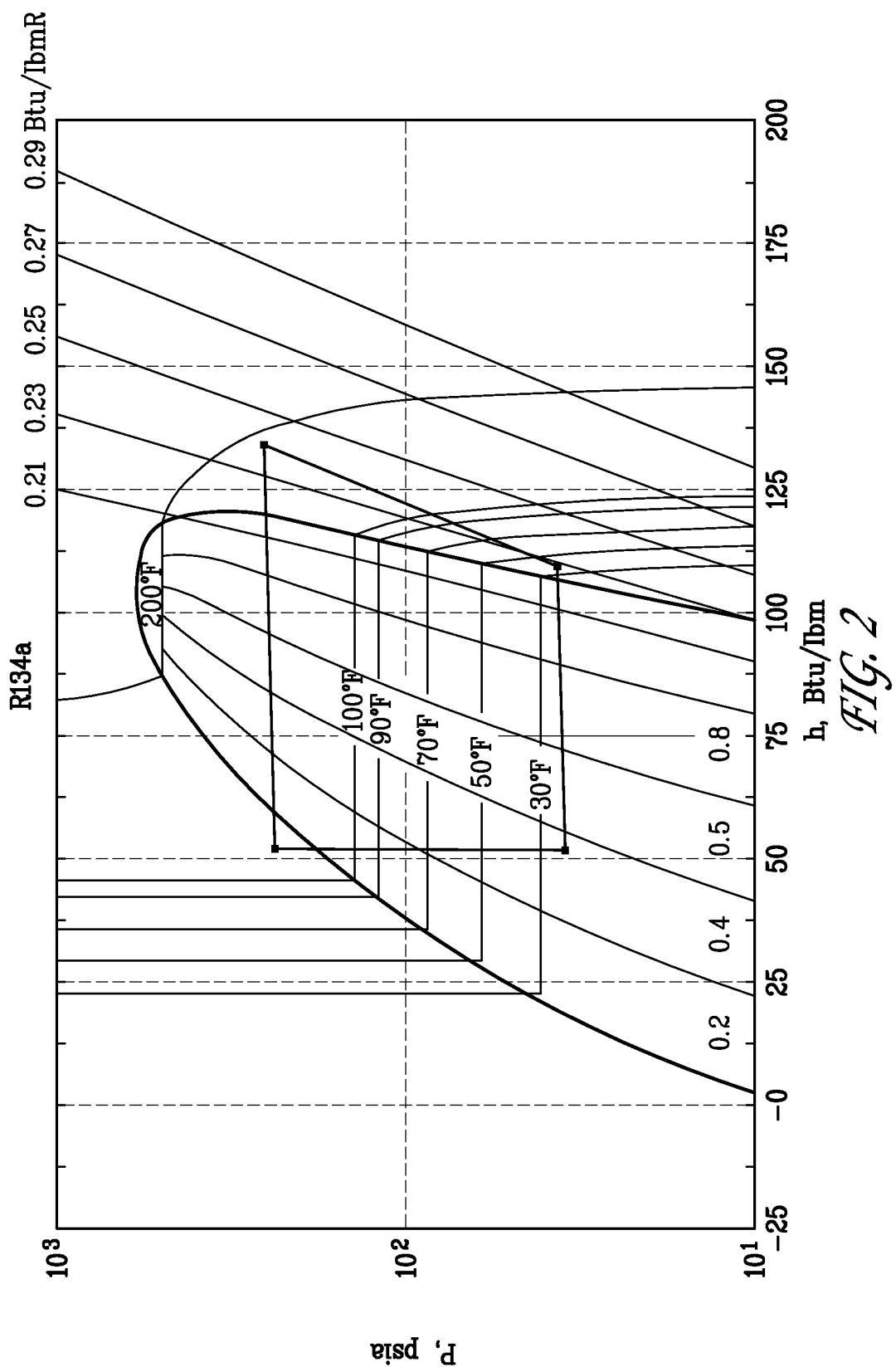
FIG. 2 illustrates the performance of a vapor compression system like that illustrated in FIG. 1.

The cooling system 300 of FIG. 3 recognizes a heightened degree of efficiency in that the pump 320 of the system 300 is not required to draw as much power as the compressor 110 in a prior art compression system 100 like that illustrated in FIG. 1. A compression system designed according to an embodiment of the presently disclosed invention may recognize exponential performance efficiencies. For example, a prior art compression system 100 as illustrated in FIG. 1 may require 1.75-2.5 kilowatts to generate 5 kilowatts of cooling power. Prior art compression system 100 therefore may operate at a coefficient of performance (COP) of less than 3. A system 300 like that illustrated in FIG. 3 may pump fluid from approximately 14.7 to approximately 120 PSI with the pump drawing power at approximately 500 W (0.5 kilowatts), with the system 300 also generating 5 kilowatts of cooling power. The system 300 may therefore operate with a COP of 10. As a result of the cycle illustrated in FIG. 3, and the resultant increased efficiencies, system 300 may utilize many working fluids, including but not limited to water.

The cooling system 300 of FIG. 3 may include a housing 310. Housing 310 of FIG. 3 is akin to that of a pumpkin. The particular shape or other design of housing 310 may be a matter of aesthetics with respect to where or how the system 300 is installed. The design of the housing 310 may be influenced by the facility in which the system 300 is installed, or by the equipment or machinery to which the system 300 is coupled. Functionally, housing 310 encloses pump 330, evaporator 350, and the attendant accessory equipment or flow paths (e.g., pump inlet 340 and evaporator tube 360). Housing 310 also contains the cooling fluid to be used by the system 300.

Figure 4:
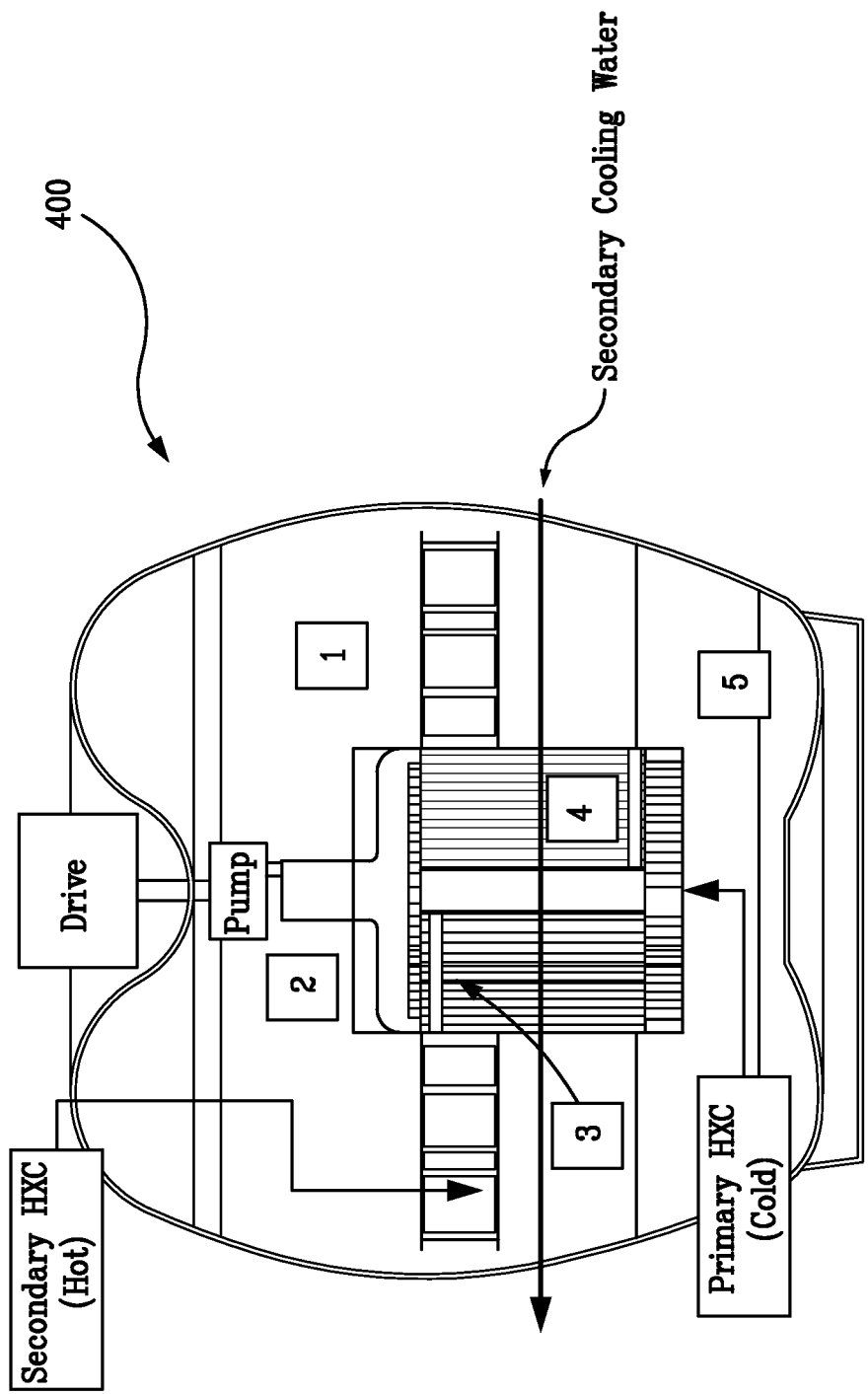
FIG. 4 illustrates an exemplary cooling system in accordance with another embodiment of the present invention.

Housing 310, in an alternative embodiment, may also encompass a secondary heat exchanger as in system 400 (illustrated in FIG. 4). The secondary heat exchanger is not necessarily contained within the housing 310. In such an embodiment, the outer surface area of the system 400—that is, the housing 310—may be utilized in a cooling process through forced convection on the external surface of the housing 310.

Pump 330 may be powered by a motor 320, which may be external to the system 300 and is located outside the housing 310 in FIG. 3. Motor 320 may alternatively be contained within the housing 310 of system 300. Motor 320 may drive the pump 330 of FIG. 3 through a rotor drive shaft with a corresponding bearing and seal or magnetic induction, whereby penetration of the housing 310 is not required. Other motor designs may be utilized with respect to motor 320 and corresponding pump 330 including synchronous, alternating (AC), and direct current (DC) motors. Other electric motors that may be used with system 300 include induction motors; brushed and brushless DC motors; stepper, linear, unipolar, and reluctance motors; and ball bearing, homopolar, piezoelectric, ultrasonic, and electrostatic motors.

Pump 330 establishes circulation of a compressible fluid through the interior fluid flow paths of system 300, the flow paths being contained within housing 310. Pump 330 may circulate fluid throughout system 300 through use of vortex flow rings. Vortex rings operate as energy reservoirs whereby added energy is stored in the vortex ring. The progressive introduction of energy to a vortex ring via pump 330 causes the corresponding ring vortex to function at a level such that energy lost through dissipation corresponds to energy being input.

Pump 330 also operates to raise the pressure of a working liquid being used by system 300 from, for example, 20 PSI to 100 PSI or more. Some systems may operate at an increased pressure of approximately 300 PSI. Other systems may operate at an increased pressure of approximately 500 PSI.

Pump inlet 340 introduces a liquid to be used in cooling and otherwise resident in system 300 (and contained within housing 310) into pump 330. Fluid temperature may, at this point in the system 300, be approximately 95 F.

The fluid introduced to pump 330 by inlet 340 traverses a primary flow path to nozzle/evaporator 350. Evaporator 350 induces a pressure drop (e.g., to approximately 5.5 PSI) and phase change that results in a low temperature. The cooling fluid further 'boils off' at evaporator 350, whereby the resident liquid may be used as a coolant. For example, the liquid coolant may be water cooled to 35-45° F. (approximately 37° F. as illustrated in FIG. 3).

As noted above, the systems 300, 400 (specifically evaporator 350) operate in the critical flow regime, thereby generating a compression wave. The coolant fluid exits the evaporator 350 via evaporator tube 360 where the fluid is 'shocked up' to approximately 20 PSI because the flow in the evaporator tube 360 is in the critical regime. In some embodiments of system 300, the nozzle/evaporator 350 and evaporator tube 360 may be integrated and/or collectively referred to as an evaporator.

The coolant fluid of system 300 (having now absorbed heat for dissipation) may be cooled at a heat exchanger to assist in dissipating absorbed heat, the temperature of the fluid being approximately 90-100° F. after having exited evaporator 350.

Figure 5:
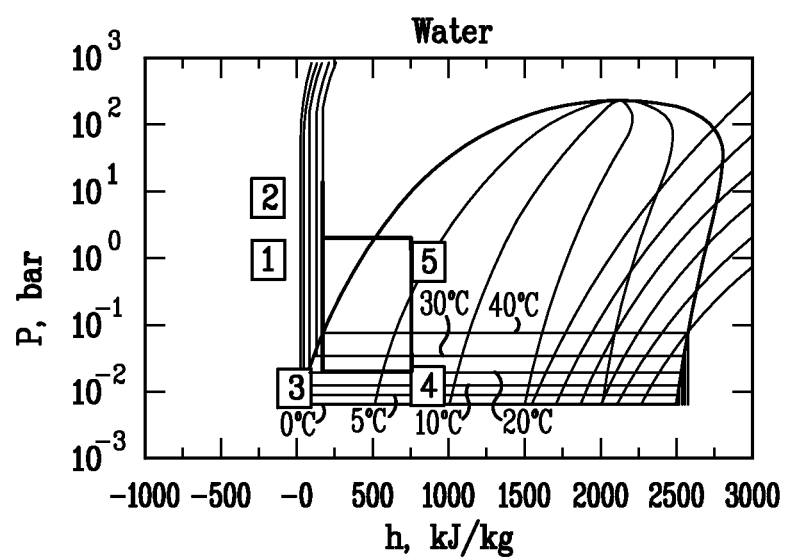
FIG. 5 illustrates performance of a cooling system like that illustrated in FIGS. 3 and 4.

Instead of a heat exchanger, however, the housing 310 of the system 300 (as was noted above) may be used to cool via convection. FIG. 5 illustrates an exemplary performance cycle of a cooling system like that illustrated in FIGS. 3 and 4.

Figure 6:
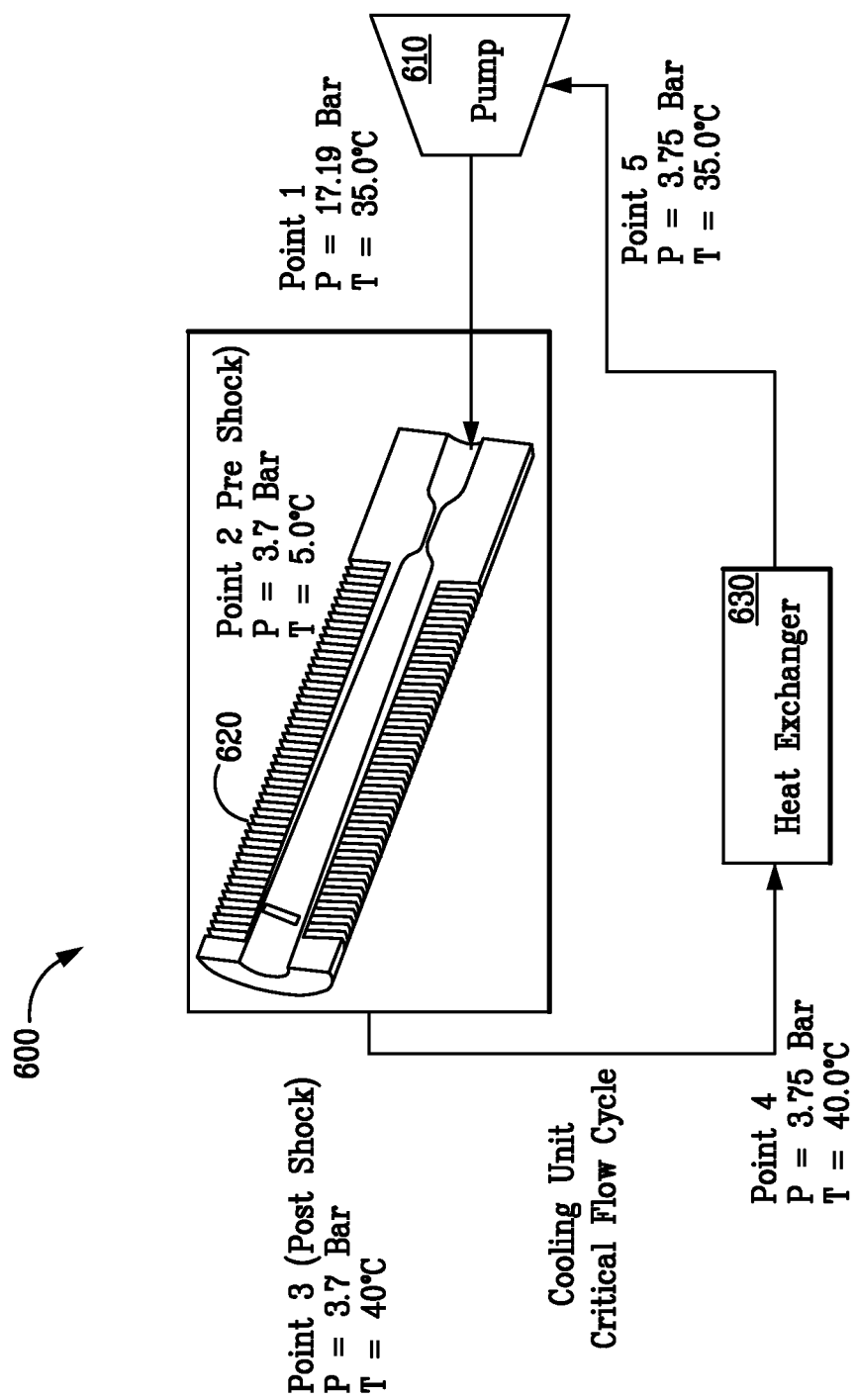
FIG. 6 illustrates the operation of a single tube cooling system.

FIG. 6 shows the operation of a single nozzle/tube cooling system 600, which may be utilized in the battery cooling system. Cooling system 600 utilizes the supersonic cooling cycle illustrated in FIGS. 3 and 4, and may be implemented in an embodiment requiring a cooling power of, for example, 300 watts. The system 600 utilizes a small pump 610 and an evaporator nozzle or tube 620.

The pump 610 raises the pressure of the working fluid in the system 600. Various working fluids, including water, may be used in the system. A refrigerant such as green refrigerant R134a may also be used. The pressure of the working fluid may be raised from approximately 20 PSI to pressure in excess of 100 PSI.

The increased pressure working fluid then flows through the evaporator nozzle or tube 620. Pressure drop and phase change as the fluid travels through the tube 620 result in a lower temperature of the working fluid in the tube 620 and provide the cooling effect for the system 600.

The pressure drop and phase change are accomplished by bringing the working fluid to its critical flow rate in the tube 620. The critical flow rate is the maximum flow rate that can be attained by a compressible fluid as that fluid passes from a high pressure region to a low pressure region (i.e., the critical flow regime). This allows a compression wave to be established and utilized in the critical flow regime. Critical flow occurs when the velocity of the fluid is greater than or equal to the speed of sound in the fluid. In critical flow, the pressure in the channel will not be influenced by the exit pressure. At the channel exit, the fluid will 'shock up' to the ambient condition.

The tube 620 functions as the evaporator in the system 600. FIG. 6 illustrates a system 600 in which a single evaporator tube 620 is utilized. Alternative configurations of the system 600 may employ more than one evaporator tube as illustrated in FIGS. 3 and 4 and depending on the requirements of a given application.

A heat exchanger 630 may be employed in a working fluid flow path in the system 600 to remove heat from the system. The heat exchanger 630 is utilized in the transfer of heat away from the battery pack. A cooling fluid thermally coupled to a working fluid may also be utilized in system 600.

In cooling system 600, the working fluid may be passed through a heat exchanger 630 to effectuate a heat transfer to the atmosphere. The operating steps of the system 600 are described in further detail below with reference to FIG. 9.

Figure 7:
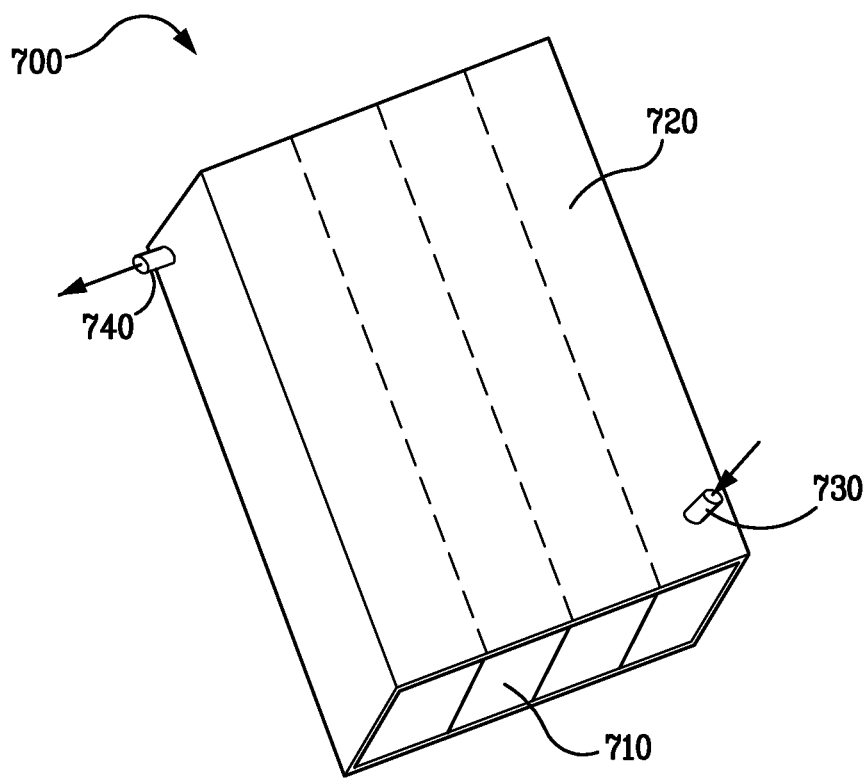
FIG. 7 illustrates a battery cooling system utilizing a cooling jacket surrounding a battery pack.

FIG. 7 shows a battery cooling system 700 that may be utilized in conjunction with a supersonic cooling cycle as illustrated in FIG. 4. The cooling cycle shown in FIG. 4 may be adapted to utilize the single nozzle cycle depicted in FIG. 6. A cooling fluid circulation path of the system 700 routes the secondary cooling water through battery cooling system 700. The battery cooling system 700 may be used to cool high power battery packs, including but not limited to those that may be utilized in EV (electric vehicle) or HEV (hybrid electric vehicle) applications.

A battery pack 710 may be cooled by a cooling jacket 720 in an implementation of the battery cooling system 700. In this configuration, the cooling jacket 720 surrounds the exterior of battery pack 710. It should be noted that the cooling element, cooling jacket 720, may accommodate whatever fluid is chosen to be used as the cooling fluid. Water and other fluids may be used as the cooling fluid in the system 700.

Cooling jacket 720 may include either a rigid or a flexible housing. The choice of housing depends on the requirements of a given application. The cooling fluid circulation path routes the cooling fluid through the cooling jacket 720. The cooling fluid in the circulation path removes heat from the battery pack. The cooling fluid flows into the cooling jacket 720 through an inlet 730, and out of the jacket 720 through an outlet 740.

Battery cooling system 700 may be powered from the battery pack which it is cooling, or from an independent 12 or 24 volt power supply. If an independent power supply is utilized, the power supply may be self-contained batteries or a solar cell. A solar cell may also be used to charge the self-contained batteries. Those skilled in the art will recognize that many power supply configurations may be utilized in the battery cooling system 700.

Figure 8:
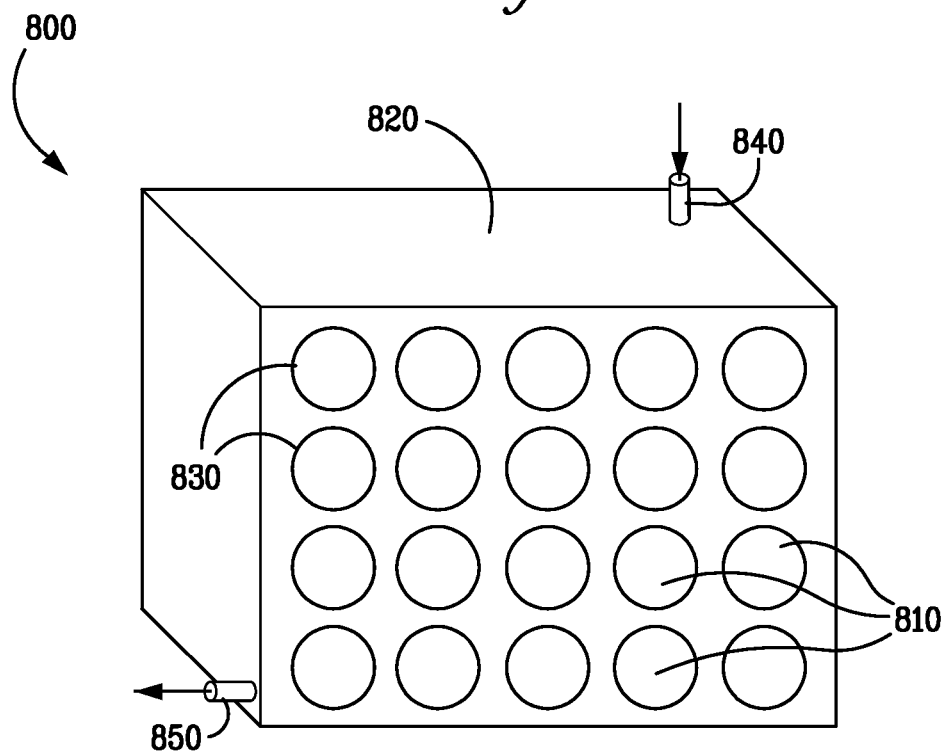
FIG. 8 illustrates a battery cooling system utilizing a cooling jacket surrounding the individual cells of a battery pack.

FIG. 8 shows a battery cooling system 800 with a battery pack that includes a plurality of battery cells 810. In battery cooling system 800, the cooling jacket 820 includes a plurality of receptacles 830. Each receptacle 830 may receive a battery cell 810. The cooling fluid circulation path of cooling system 800 flows around one or more of the battery cells 810 contained in receptacles 830 to remove heat from the battery pack. The cooling fluid flows into the cooling jacket 820 through an inlet 840, and out through an outlet 850.

Figure 9:
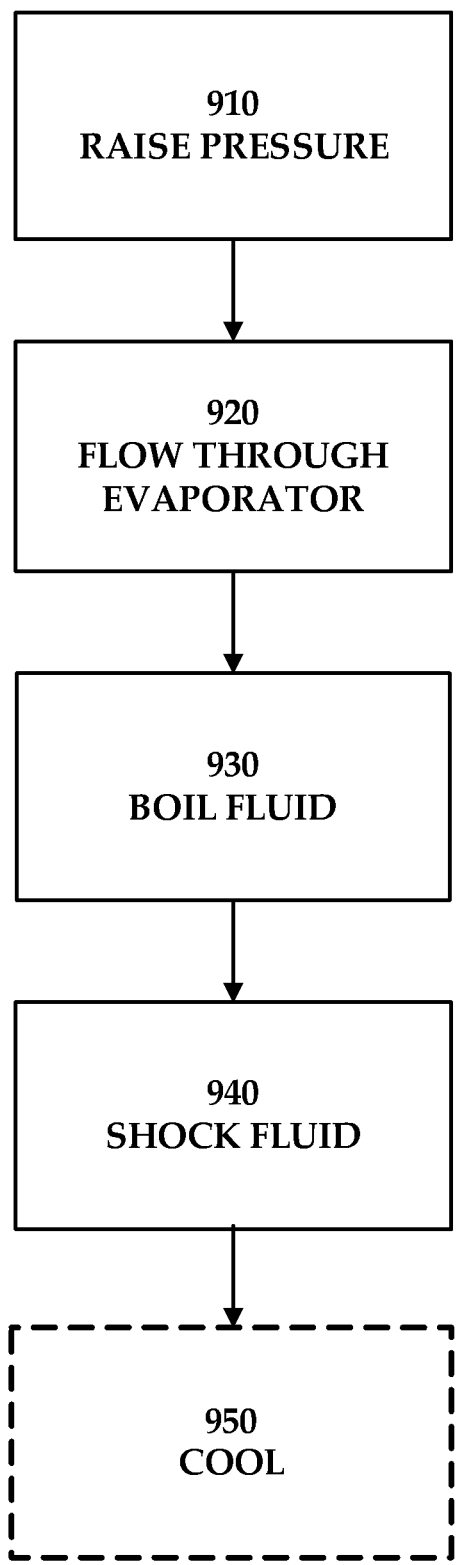
FIG. 9 illustrates a method of operation for a battery cooling system.

FIG. 9 illustrates a method of operation 900 for the cooling systems 300, 400. In step 910, a pump raises the pressure of a liquid. The pressure may, for example, be raised from 20 PSI to in excess of 100 PSI. As mentioned above, the increased pressure may be 300 PSI or even 500 PSI. In step 920, fluid flows through the nozzle/evaporator tube(s). Pressure drop and phase change result in a lower temperature as fluid is boiled off in step 930.

Critical flow rate, which is the maximum flow rate that can be attained by a compressible fluid as that fluid passes from a high pressure region to a low pressure region (i.e., the critical flow regime), allows for a compression wave to be established and utilized in the critical flow regime. Critical flow occurs when the velocity of the fluid is greater or equal to the speed of sound in the fluid. In critical flow, the pressure in the channel will not be influenced by the exit pressure and at the channel exit, the fluid will 'shock up' to the ambient condition. In critical flow the fluid will also stay at the low pressure and temperature corresponding to the saturation pressures. In step 740, after exiting the evaporator tube, the fluid "shocks" up to 20 PSI. A heat exchanger may be used in optional step 950. Cooling may also occur via convection on the surface of the housings of the systems 300, 400.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A battery cooling system, comprising:
   a cooling fluid circulation path thermally coupled to a working fluid flow path and to at least one battery cell in a battery pack;
   a pump that maintains a fluid flow through the working fluid flow path;
   an evaporator that operates in the critical flow regime of the working fluid and generates a compression wave that shocks the maintained fluid flow, thereby changing the pressure of the maintained fluid flow to cool the fluid, the fluid flow provided to the evaporator by the pump without passing through a heater; and
   a heat exchanging mechanism thermally coupled to the fluid flow path, the heat exchanging mechanism removing heat from the battery pack.

2. The battery cooling system of claim 1, further comprising a cooling jacket, the cooling jacket being thermally coupled to the working fluid flow path and to at least a portion of the battery pack.

3. The battery cooling system of claim 2, wherein the cooling jacket includes a plurality of receptacles, each receptacle receiving a cell of the battery pack.

4. The battery cooling system of claim 2, wherein the cooling jacket surrounds the battery pack.

5. The battery cooling system of claim 2, wherein the cooling jacket comprises a rigid housing.

6. The battery cooling system of claim 2, wherein the cooling jacket comprises a flexible housing.

7. The battery cooling system of claim 1, wherein the heat exchanging mechanism comprises a plurality of fins to increase the surface area of the heat exchanging mechanism.

8. The battery cooling system of claim 1, wherein a single tube is utilized in the evaporator.

9. The battery cooling system of claim 1, wherein the pump raises the pressure of the fluid flow from approximately 20 PSI to approximately 100 PSI.

10. The battery cooling system of claim 1, wherein the pump raises the pressure of the fluid flow to more than 100 PSI.

11. A battery cooling system, comprising:
    a fluid flow path that passes in close proximity to at least one battery cell in a battery pack;
    a pump that maintains a fluid flow through the fluid flow path; and
    at least one evaporator that operates in the critical flow regime of the fluid and generates a compression wave that shocks the maintained fluid flow, thereby changing the pressure of the maintained fluid flow to cool the fluid, the cooled fluid removing heat from the battery cell via conduction, the fluid flow provided to the evaporator by the pump without passing through a heater.

12. The system of claim 11, wherein the at least one evaporator comprises a series of single tube evaporators aligned in parallel with a plurality of battery cells, each single tube evaporator removing heat from the aligned battery cell.

13. The system of claim 11, further comprising a pump inlet that introduces a cooling liquid to the pump, and wherein the cooling liquid is a part of the fluid flow.

14. The system of claim 13, wherein the cooling liquid is water.

15. The system of claim 13, wherein the evaporator induces a pressure drop in the cooling liquid to approximately 5.5 PSI, a corresponding phase change resulting in a lowered temperature of the cooling liquid.

16. The system of claim 13, wherein a pressure change within the fluid flow of the compressible fluid occurs within a range of approximately 20 PSI to 100 PSI.

17. The system of claim 13, wherein a pressure change within the fluid flow of the compressible fluid involves a change to an excess of 100 PSI.

18. The system of claim 13, wherein a pressure change within the fluid flow of the compressible fluid involves a change to less than 20 PSI.

19. The system of claim 13, wherein the pump raises the pressure of the fluid flow from approximately 20 PSI to approximately 100 PSI.

20. The system of claim 13, wherein the pump raises the pressure of the fluid flow to more than 100 PSI.

* * * * *